No. 615,948. Patented Dec. 13, 1898.
G. P. ALBRIGHT.
MECHANICAL MOTOR.
(Application filed Jan. 12, 1898.)
(No Model.) 2 Sheets—Sheet 2.

Witnesses:
C. E. Van Doren
Richard Paul

Inventor:
George P. Albright.
By Paul & Hawley
his attys

UNITED STATES PATENT OFFICE.

GEORGE P. ALBRIGHT, OF MINNEAPOLIS, MINNESOTA.

MECHANICAL MOTOR.

SPECIFICATION forming part of Letters Patent No. 615,948, dated December 13, 1898.

Application filed January 12, 1898. Serial No. 666,394. (No model.)

*To all whom it may concern:*

Be it known that I, GEORGE P. ALBRIGHT, of Minneapolis, Hennepin county, Minnesota, have invented certain new and useful Improvements in Mechanical Motors, of which the following is a specification.

My invention relates to that class of mechanical motors that are operated by weights; and the objects of the invention are to provide a mechanical motor designed particularly for use in pumping water for stock or for irrigation purposes in parts of the country where wind cannot be relied upon; to provide a mechanical motor for raising water to an elevated tank, from whence it may be drawn for distribution at a distant point; to provide means governed by the rise and fall of water in the tank for controlling the operation of the motor, and, further, to provide a mechanical motor which will be simple in construction, yet strong and durable, and one that will run for a long time without attention.

The invention consists generally in the constructions and combinations hereinafter described, and particularly pointed out in the claim.

Figure 1:
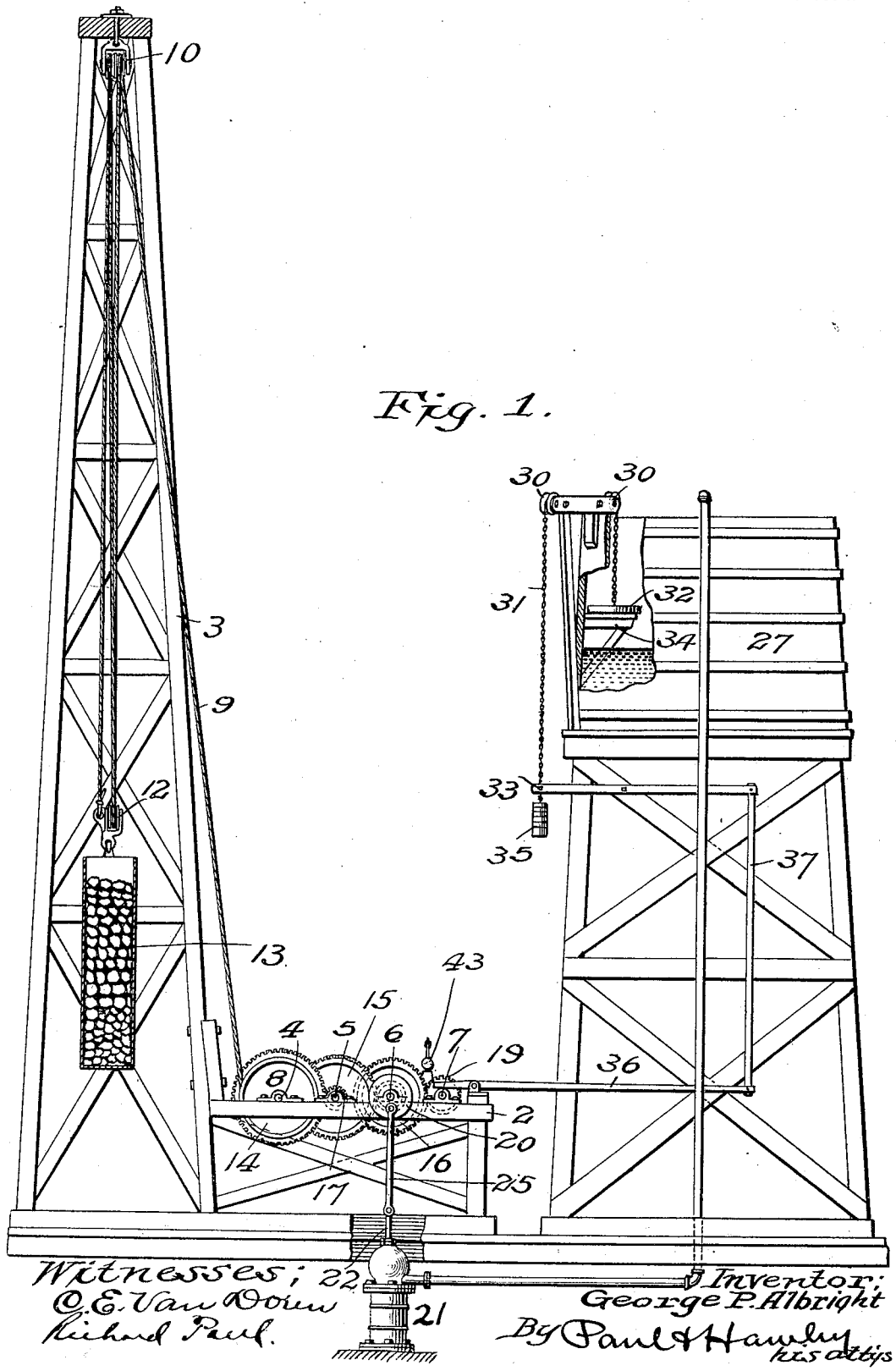
Figures 2, 3:
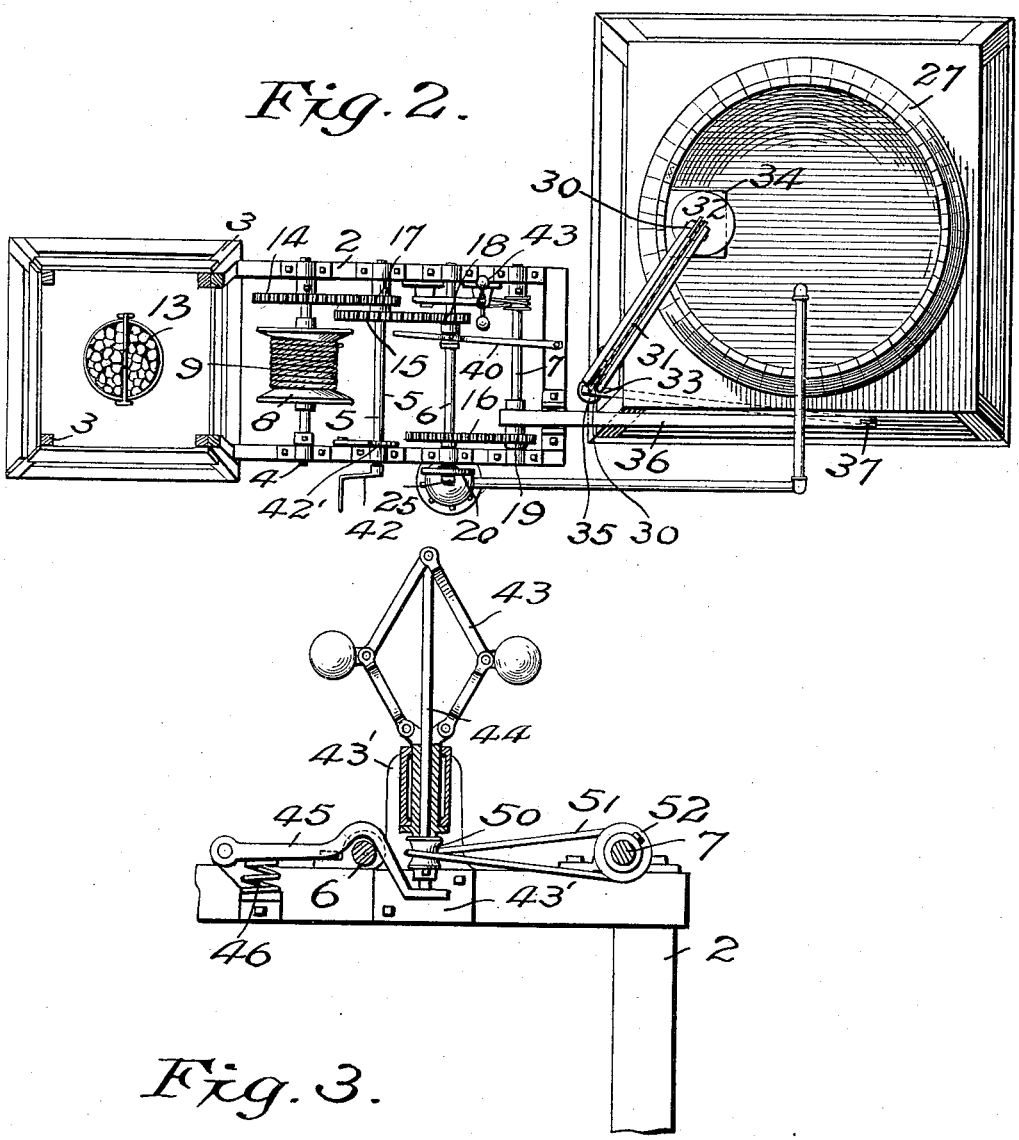

In the accompanying drawings, forming part of this specification, Figure 1 is a side elevation of a mechanical motor and tank embodying my invention. Fig. 2 is a plan view, the upper portion of the tower being broken away. Fig. 3 is a detail of the governor for controlling the speed of the motor.

In the drawings, 2 is a horizontal framework supporting the motor-gearing, and 3 the upright timbers of the tower wherein the weight is supported. Mounted in bearings on the top of the frame 2 are a series of parallel shafts 4, 5, 6, and 7. The shaft 4 carries the drum 8, over which passes a cable 9, having one end secured to the drum, and its opposite end, after passing through the double pulley-block 10, is secured to the single pulley-block 12 at the upper end of the bucket 13. With this arrangement the bucket will descend slowly and the motor will run for a long time without attention. Through gear-wheels 14, 15, and 16 and pinions 17, 18, and 19 on said shafts power is conveyed to a pump or other machinery to be operated. Upon one end of the shaft 6 I provide a crank-disk 20, and at the side of the frame 2 I arrange a pump 21, having a pump-rod 22, connected with eccentric 20 by a pitman-rod 25, so that the pump will be operated by the revolution of the shaft 6.

At one side of the frame 2 I arrange an elevated tank 27, having pulleys 30, over which passes a chain or cord 31, connected at one end to a float 32 within the tank and at its other end to one end of the lever 33, which is pivotally secured to the timbers supporting the tank 27. A shelf 34 within the tank supports the float 32 when the water in the tank falls below the level of the shelf. A weight 35 on the end of the lever 33 insures the uniform and regular up-and-down movement of the lever and float. The opposite end of the lever 33 is connected with a lever 36 by a rod 37, and said lever 36 is also pivotally supported upon the frame 2, its short end bearing upon the shaft 7, by means of which the movement of the motor may be checked or stopped when the water in the tank rises to a predetermined point. The pinion 18 is arranged to slide upon the shaft 6, and by means of a pivoted lever 40 the pinion may be disengaged from the gear-wheel 15 when it is desired to stop the motor while the weight is being raised or for any other purpose.

One end of the shaft 5 is squared to receive a crank 42, by means of which the drum may be revolved to raise the weight in the tower, or instead of using a hand-crank any suitable means may be employed for raising the weight by horse-power.

42' is a ratchet device for locking the shaft 5 when the pinion 18 is disengaged from the gear 15.

I have shown in the drawings a bucket or car adapted to contain a quantity of stones, and I find that this form of weight is preferable, as the weight may be increased or diminished at any time, according to the depth of the well or the speed at which it is desired to drive the motor. I do not, however, confine myself to this construction, as any other weight, such as a solid block of metal, may be used, if desired.

For controlling the speed of the motor I provide a governor 43, mounted upon an upright shaft 44, which is supported in bearings on the frame 43', which is secured to the frame 2, whereon the motor is mounted. The lower end of the shaft 44 rests upon a pivoted arm 45, that bears upon the shaft 6 and is normally held out of engagement therewith by a spring 46. Upon the shaft 44 is a pulley 50, over which passes a belt 51 to the pulley 52 on the shaft 7. Should the motor attain a high rate of speed, the governor will force the shaft 44 down against the end of the lever-arm 45, causing the same to bear upon the shaft 6 and retard the speed of the motor. I have found this device to be very useful in connection with a motor, for should the water in the well become low or run dry there would be great danger of the machinery becoming damaged or broken by the racing of the pump. While I have shown four shafts and the gearings connecting the same, it is obvious that a greater or less number of gears may be employed, according to the size of the motor and the weight that is to be used to operate the same.

The operation of the device is as follows: The weight having been raised to the top of the tower and the pinion 18 meshed with the gear-wheel 15, the pump will be started and the water forced up into the tank through the pipe leading thereto. As the water rises in the tank the float therein will be raised also, permitting the lever 33 to swing downward until the end of the lever 36 bears upon the surface of the shaft 7 and stops the motor. When the water in the tank falls, the float will gradually raise the lever 33 and permit the motor to start again and resume the operation of pumping.

I have found the device of great value in sections of the country where the power of the wind cannot be relied upon to operate windmills and where the pumping of water for irrigation purposes particularly has been found to be very laborious and expensive. With the aid of this device a pump can be set in operation and will require no attention until the weight has reached the bottom of the tower, and then the pumping will only be delayed for a few moments, as the weight can be easily raised again by means of the device heretofore described.

Instead of using an elevated tank in connection with the motor and pump I may arrange a water-trough and make suitable connections with the float, so that as the water rises above a certain predetermined point the operation of the motor will be checked in substantially the manner heretofore described. With this arrangement a sufficient quantity of water will be supplied to the trough for watering a herd of cattle without the necessity of an attendant to operate the pump.

Having thus described my invention, I claim as new and desire to secure by Letters Patent—

The combination, with a mechanical motor, of a pump 21, a crank-disk 20 upon said motor, a pump-rod 25 connected with said crank-disk, an elevated tank 27, a pipe connecting said pump and said tank, a float 32 provided in said tank, a lever 33 connected with said float, a lever 35 having one end adapted to bear upon a shaft in said motor, and a link 37 connecting said levers 33 and 36, substantially as described.

In testimony whereof I have hereunto set my hand this 4th day of January, 1898.

GEORGE P. ALBRIGHT.

In presence of—
RICHARD PAUL,
M. C. NOONAN.